(12) United States Patent
Mote et al.

(10) Patent No.: US 11,629,978 B2
(45) Date of Patent: Apr. 18, 2023

(54) ABSOLUTE STEERING SENSOR ASSEMBLY

(71) Applicant: BCS AUTOMOTIVE INTERFACE SOLUTIONS US LLC, Wilmington, DE (US)

(72) Inventors: Vidyasagar Mote, Novi, MI (US); Rich Neuhaus, Farmington Hills, MI (US); Vivek Mohile, West Bloomfield, MI (US)

(73) Assignee: BCS AUTOMOTIVE INTERFACE SOLUTIONS US LLC, Wilmington, DE (US)

( * ) Notice: Subject to any disclaimer, the term of this patent is extended or adjusted under 35 U.S.C. 154(b) by 99 days.

(21) Appl. No.: 17/185,053

(22) Filed: Feb. 25, 2021

(65) Prior Publication Data

US 2022/0268600 A1 Aug. 25, 2022

(51) Int. Cl.
*G01D 5/14* (2006.01)
*G01D 11/24* (2006.01)
*B62D 15/02* (2006.01)

(52) U.S. Cl.
CPC ......... *G01D 5/145* (2013.01); *B62D 15/0215* (2013.01); *G01D 11/245* (2013.01)

(58) Field of Classification Search
CPC .............................. G01D 5/145; G01D 11/245
See application file for complete search history.

(56) References Cited

U.S. PATENT DOCUMENTS

| 7,352,174 B1* | 4/2008 | Lee | G01D 5/25 335/206 |
| 8,854,035 B2* | 10/2014 | Akahane | G01D 5/145 324/207.25 |
| 2018/0269016 A1* | 9/2018 | Gudimalla | H01H 36/00 |

FOREIGN PATENT DOCUMENTS

KR 20090110167 * 10/2009

* cited by examiner

*Primary Examiner* — Reena Aurora
(74) *Attorney, Agent, or Firm* — McNees Wallace & Nurick LLC

(57) ABSTRACT

An absolute steering sensor assembly (10) is provided, comprising a printed circuit board (18), at least one hall sensor (20, 22) being attached to the printed circuit board (18), at least one magnet (34, 36) being rotatably mounted such that the magnet (34, 36) is rotated upon a rotation of a steering column (26), the at least one magnet (34, 36) being placed in proximity of the at least one hall sensor (20, 22) such that the hall sensor (20, 22) can detect the magnetic field emitted by the magnet (34,36), and a protective cover (38, 40) being attached to the printed circuit board (18) such that the protective cover (38, 40) is placed between the magnet (34, 36) and the printed circuit board (18).

9 Claims, 4 Drawing Sheets

ABSOLUTE STEERING SENSOR ASSEMBLY

Figure 1:
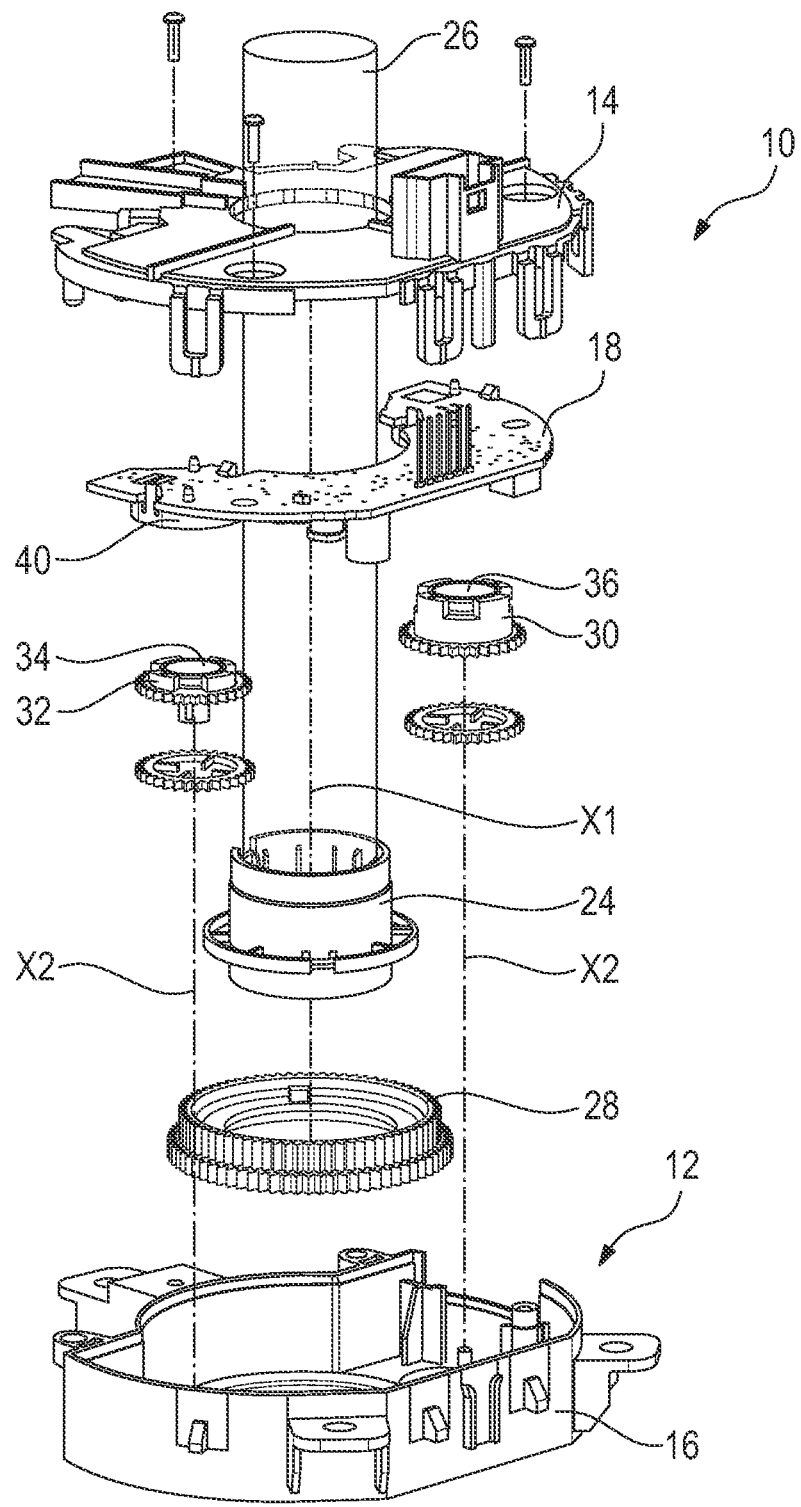

The invention relates to an absolute steering sensor assembly for use in a vehicle.

Steering sensor assemblies in vehicles are used for detecting a steering angle of a steering wheel. For this purpose, a steering sensor assembly usually comprises a hall sensor being attached to a printed circuit board and a magnet being rotatably mounted such that the magnet is rotated upon a rotation of a steering column. The hall sensor detects a rotation of the magnet and can therefrom deduce an angular position of a steering wheel.

Upon rotation of the steering column, the steering column or the magnet may be in contact with the printed circuit board. This is disadvantageous since the conducting paths on the printed circuit board may become damaged. To avoid damaging the conducting paths, the printed circuit board is coated with hard gold. However, this requires an additional processing step and is thus expensive and labour intensive.

It is thus an object of the present invention to improve the service life of the components of the steering sensor assembly in a cost effective way.

According to the invention, this object is achieved by an absolute steering sensor assembly comprising a printed circuit board, at least one hall sensor being attached to the printed circuit board, at least one magnet being rotatably mounted such that the magnet is rotated upon a rotation of a steering column, the at least one magnet being placed in proximity of the at least one hall sensor such that the hall sensor can detect the magnetic field emitted by the magnet, and a protective cover being attached to the printed circuit board such that the protective cover is placed between the magnet and the printed circuit board.

The protective cover serves as a spacer between the magnet and the printed circuit board and thus avoids abrasion of the printed circuit board. In other words, the protective cover prevents a contact between the magnet and/or the steering column or other rotating parts with the printed circuit board. Thereby, it is reliably prevented that conductive paths on the printed circuit board are damaged, which would render the sensor assembly inoperable. Consequently, the service life of the steering sensor assembly is improved.

The protective cover is preferably made of plastic. Thus, a rotation of the magnet or other parts being in contact with the protective cover causes less noise than a rotation of the respective parts on the printed circuit board. Further, the protective cover can be manufactured at low cost.

The protective cover is attached to the printed circuit board in a fixed position, i. e. the protective cover does not rotate together with the magnet or the steering column.

According to one embodiment, the at least one magnet is fixed to a rotatable gear, wherein the gear is in contact with the protective cover. By means of a gear, the magnet is arranged displaced from the steering column, i. e. the rotation axis of the magnet is not coaxial with the rotation axis of the steering column. Further, the magnet may be rotated with a different rotational speed than the steering column.

For example, the hall sensor is attached to a surface of the printed circuit board facing towards the magnet and the protective cover covers the hall sensor. Thereby, the protective cover protects the hall sensor from contact with dirt and grease. This also contributes to a long service live of the sensor assembly.

According to one embodiment, the protective cover has an opening and the hall sensor is placed in the opening. Thereby, the sensor assembly may be particularly compact. In particular, the magnet may be placed in close proximity to the hall sensor.

The protective cover preferably comprises at least one locking snap by means of which the protective cover is attached to the printed circuit board. Thereby, the protective cover can be easily snapped to the printed circuit board. Thus, no separate fastening elements like screws etc. are needed for fixing the protective cover to the printed circuit board.

In a further embodiment, the printed circuit board is attached to a housing part by means of the protective cover. In particular, the protective cover comprises at least one locking snap, preferably two or more locking snaps, that protrude over the printed circuit board and engage with the housing part. Consequently, the printed circuit board is clamped between the protective cover and the housing part. Thereby, the advantage is achieved that neither for fastening the protective cover nor for fastening the printed circuit board to the housing separate fastening elements are needed.

In both embodiments, the fastening means may be flexible such that they can engage with the printed circuit board in a form-fitting manner.

In particular, the locking snap may have a protrusion that engages behind the printed circuit board respectively in the housing part.

For example, the protective cover comprises at least one positioning pin and the printed circuit board comprises at least one corresponding hole into which the positioning pin engages. Thereby, the protective cover is placed in a defied position with respect to the printed circuit board.

In one embodiment, the steering sensor assembly comprises a main gear that is rotationally fixed with respect to a steering column, wherein the rotatable gear to which the magnet is fixed is driven by the main gear. The magnet can therefore be rotated by the steering column without being fixed to the steering column.

Figure 2:
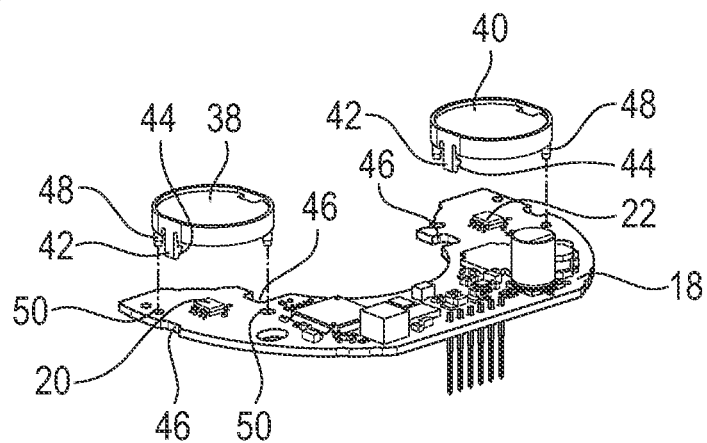
Figure 3:
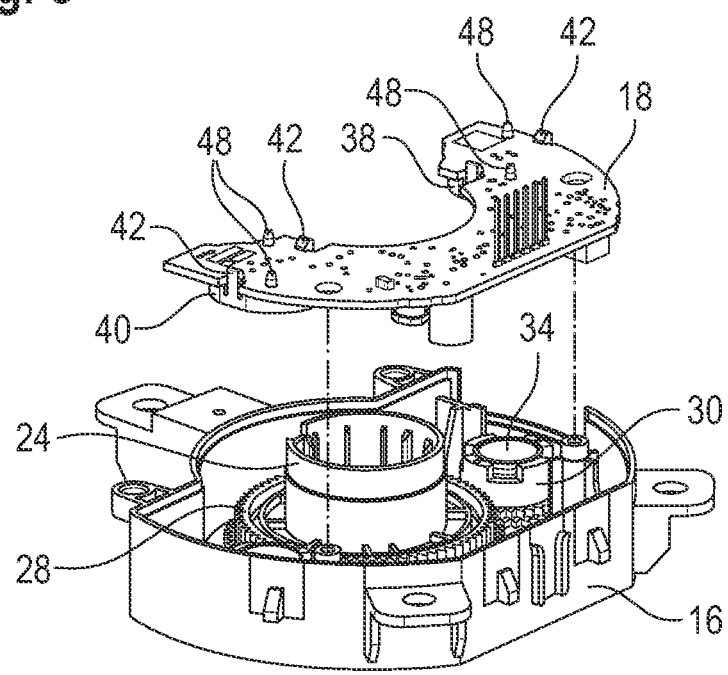
Figure 4:
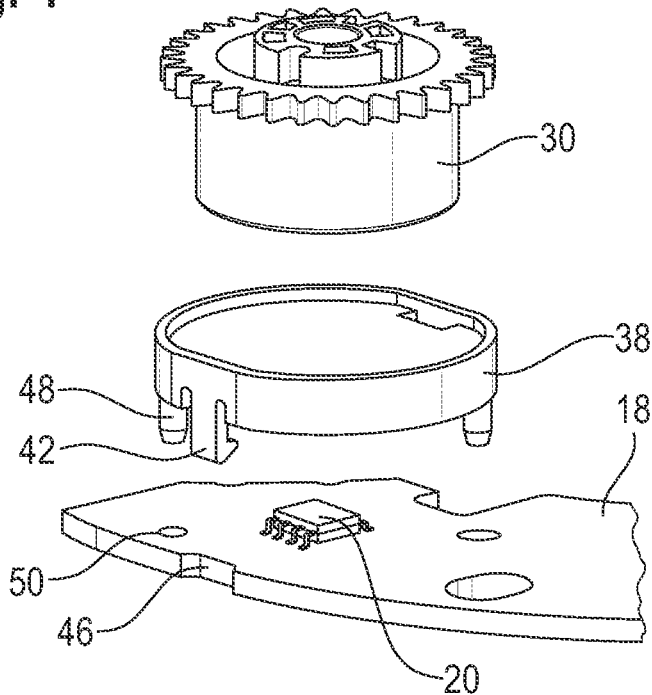
Figure 5:
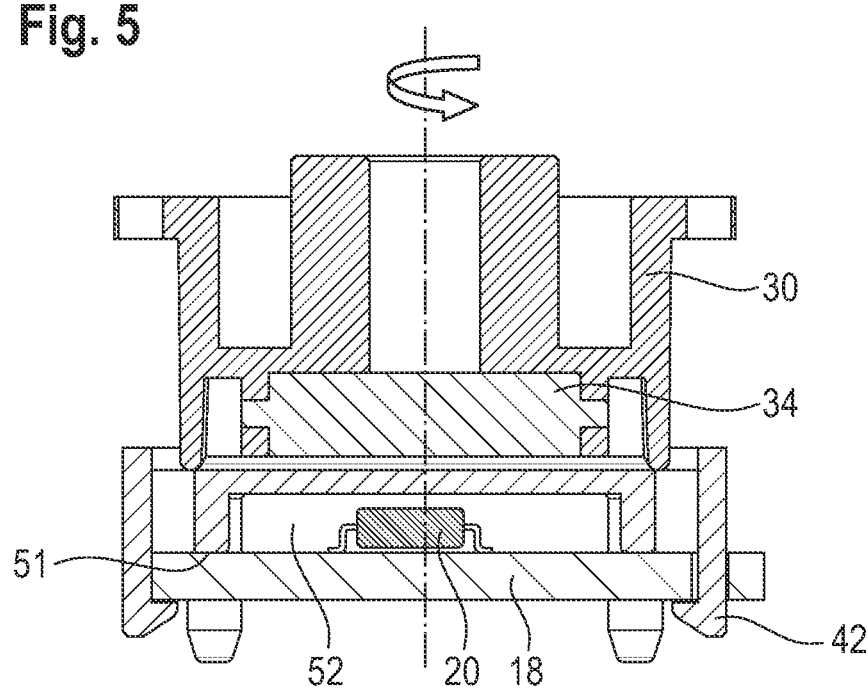
Figure 6:
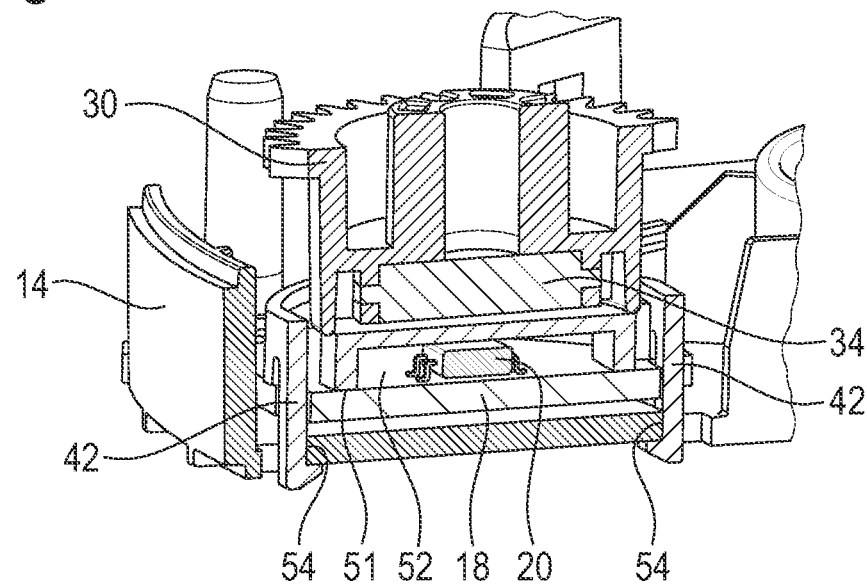
Figure 7:
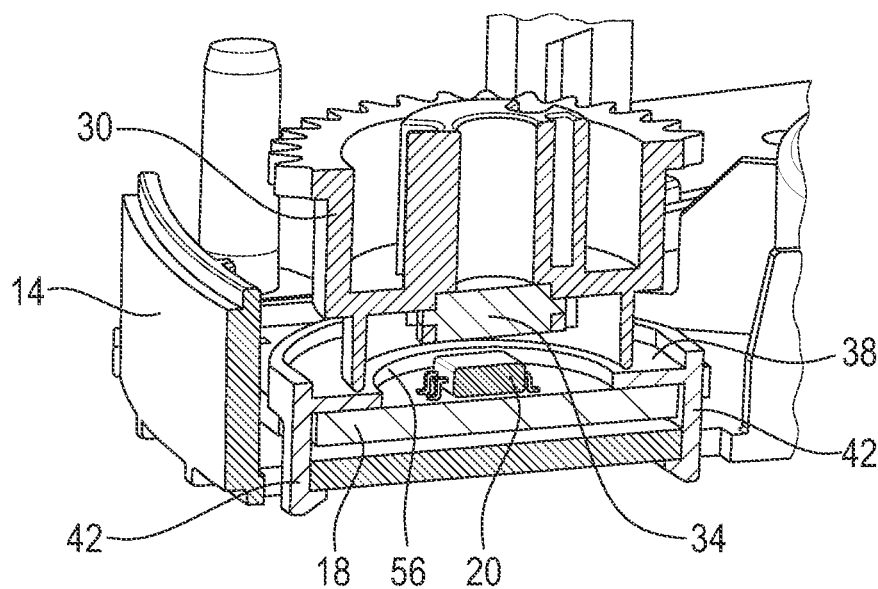

Further features and embodiments can be derived from to the following description and from the drawings to which is referred. In the drawings:

FIG. 1 shows an inventive absolute steering sensor assembly in an exploded view, FIG. 2 shows a subassembly of the steering sensor assembly of FIG. 1, FIG. 3 shows a further subassembly of the steering sensor assembly of FIG. 1, FIG. 4 shows a detailed view in of a further subassembly of the steering sensor assembly of FIG. 1, FIG. 5 shows the subassembly of FIG. 4 in an assembled view, FIG. 6 shows a subassembly according to a further inventive embodiment, and FIG. 7 shows a subassembly according to a further inventive embodiment.

FIG. 1 shows an absolute steering sensor assembly 10 for detecting a steering angle of a steering wheel of a vehicle in an exploded view.

The steering sensor assembly 10 comprises a housing 12 which consists of a first housing part 14 and a second housing part 16.

A printed circuit board 18 is arranged in the housing 12. To the printed circuit board 18, a first hall sensor 20 and a second hall sensor 22 are attached, which are hidden in FIG. 1, but are shown in FIG. 2.

The steering sensor assembly 10 further includes an adapter 24 which is operatively connected to a steering column 26 such that rotation of the steering column 26 also rotates the adaptor 24. In particular the adapter 24 is attached to the steering column in a rotationally fixed manner.

To an outer periphery of the adapter 24, a main gear 28 is attached. In particular, the main gear 28 is coupled to the steering column 26 via adapter 24. Thus, the main gear 28 is rotated together with the steering column 26.

The main gear 28 is arranged concentrically with the steering column 26.

The steering column 26 extends along the steering column axis X1 and is operatively connected to rotate with a steering wheel. As such, when a driver of the vehicle rotates the steering wheel, the steering column 26, adaptor 24 and main gear 28 are rotated.

The steering sensor assembly 10 further comprises a first rotatable gear 30 and a second rotatable gear 32 that are separately driven by the main gear 28.

In particular, the first gear 30 is rotated about a first gear axis X2 and the second gear 32 is rotated about a second gear axis X3 which is parallel to the first gear axis X2.

To each of the first and second gear 30, 32, a magnet 34, 36 is attached in a rotationally fixed manner. For example, the magnets 34, 36 may be overmolded with the material of the first and second gear 30, 32.

Due to the first and the second gear 30, 32 being engaged with the main gear 28, each of the magnets 34, 36 is rotated upon a rotation of a steering column 26.

The first gear 30 has a first gear pitch diameter and the second gear 32 has a second gear pitch diameter, wherein the first and second gear pitch diameters are different. Furthermore, the first gear 30 and the second gear 32 have different diameters. Consequently, when the main gear 28 is rotated, the first gear 30 and the second gear 32 are rotated with different rates.

In the depicted embodiment, the gears 30, 32 are composed of two separate parts. However, in an alternative embodiment the gears 30, 32 can be manufactured as single part, respectively.

The first magnet 34 is placed in proximity of the first hall sensor 20 such that the first hall sensor 20 can detect the magnetic field emitted by the first magnet 34.

The second magnet 36 is placed in proximity of the second hall sensor 22 such that the second hall sensor 22 can detect the magnetic field emitted by the second magnet 36.

The first hall sensor 20 and the second hall sensor 22 are attached to a surface of the printed circuit board 18 facing towards the magnets 34, 36.

The hall sensors 20, 22 may be connected to an electronic control unit which is not shown in the Figures.

When the first gear 30 respectively the first magnet 34 is rotated, variations in a first magnetic field are measured by the first hall sensor 20. The first hall sensor 20 then outputs a first signal indicating the measurements of the first magnetic field.

The variations in the second magnetic field upon rotation of the second gear 32 respectively the second magnet 34 are measured by the second hall sensor 22 and the second hall sensor 22 then outputs a second signal indicating the measurements of the second magnetic field.

The signals are used by the electronic control unit to calculate a first position value, for example in degrees of rotation of the first gear 30, and a second position value for example in degrees of rotation of the second gear 32.

The first and the second value may be used by the electronic control unit in an algorithm to determine an absolute steering angle. The absolute steering angle corresponds to a position of the steering wheel.

By providing two hall sensors 20, 22 and two magnets 34, 36 rotating with a different rate, a higher accuracy can be achieved than by using only one hall sensor and one magnet.

However, according to a simplified embodiment, which is not shown in the Figures for sake of simplicity, a single magnet can be provided which is coupled to the steering column 26 in a rotationally fixed manner. Consequently, only one hall sensor is necessary which detects the magnetic field emitted by the magnet.

Two protective covers 38, 40 are attached to the printed circuit board 18 such that the protective covers 38, 40 are respectively placed between the first and the second magnet 34, 36 and the printed circuit board 18.

In particular, as shown in FIG. 2, which shows a subassembly of the steering sensor assembly 10 in an exploded view, the protective covers 38, 40 are placed over the hall sensors 20, 22 i. e. cover the hall sensors 20, 22.

Preferably, the protective covers 38, 40 are identical.

Each of the protective covers 38, 40 comprises two locking snaps 42.

By means of the locking snaps 42, the protective covers 38, 40 are attached to the printed circuit board 18, as shown in FIG. 3, which shows a further subassembly of the steering sensor assembly 10.

In particular, the locking snaps 42 are engaged with the printed circuit board 18 in a form-fitting manner.

For this purpose, each of the locking snaps 42 has a nose 44 formed integrally with the locking snap 42.

In order to enable an engagement of the protective covers 38, 40 with the printed circuit board 18, the locking snaps 42 are flexible.

The printed circuit board 18 has recesses 46 corresponding to the locking snaps 42.

The protective covers 38, 40 further comprise positioning pins 48 and the printed circuit board 18 comprises corresponding holes 50 into which the positioning pins 48 engage.

FIG. 4 shows a part of the printed circuit board 18 with the first hall sensor 20, the first protective cover 38 and the first magnet 34 in an exploded view. In FIG. 5, the respective parts are shown in an assembled condition in a sectional view.

The first gear 30, to which the first magnet 34 is attached, is in contact with the protective cover 38. Thus, the printed circuit board 18, in particular the conductive paths on the printed circuit board 18 are protected from abrasion.

When the protective cover 38 is attached to the printed circuit board 18, the protective cover 38 rests against a surface of the printed circuit board 18 with an abutment surface 51.

The protective cover 38 further comprises a cavity 52 in which the hall sensor 20 is received.

In the same way as depicted in FIGS. 4 and 5 for the first hall sensor 20 and the first magnet 34, the second hall sensor 22 is covered by the second protective cover 40 and the second gear 32 to which the second magnet 36 is attached is in contact with the second protective cover 40.

FIG. 6 shows a subassembly of a steering sensor assembly 10 according to a further embodiment.

In the embodiment depicted in FIG. 6, the printed circuit board 18 is attached to the first housing part 14 by means of the protective cover 38.

Compared to the embodiment of FIGS. 4 and 5, the locking snaps 42 of the protective cover 38 protrude further beyond the printed circuit board 18 and engage with the first housing part 14. In particular, the locking snaps 42 extend through recesses 54 in the first housing part 14.

Thus, the protective cover 38 is snapped into the first housing part 14.

The printed circuit board 18 is clamped between the protective cover 28 and the first housing part 14.

FIG. 7 shows a subassembly of a steering sensor assembly 10 according to a further embodiment.

In this embodiment, the protective cover 38 has an opening 56 and the hall sensor 20 is placed in the opening.

This results in a more compact design of the steering sensor assembly 10.

Further, the magnet 34 can be smaller compared to the embodiment of FIG. 6 without the opening 56.

The invention claimed is:

1. An absolute steering sensor assembly, comprising:
a printed circuit board;
at least one hall sensor attached to the printed circuit board;
at least one magnet rotatably mounted such that the at least one magnet is rotated upon a rotation of a steering column, the at least one magnet being placed in proximity of the at least one hall sensor such that the at least one hall sensor can detect the magnetic field emitted by the at least one magnet; and
a protective cover attached to the printed circuit board such that the protective cover is placed between the at least one magnet and the printed circuit board,
wherein the protective cover has an opening and the at least one hall sensor is placed in the opening.

2. The steering sensor assembly according to claim 1, wherein the at least one magnet is fixed to a rotatable gear, wherein the gear is in contact with the protective cover.

3. The steering sensor assembly according to claim 2, wherein the steering sensor assembly comprises a main gear that is rotationally fixed with respect to a steering column, and wherein the rotatable gear to which the at least one magnet is fixed is driven by the main gear.

4. The steering sensor assembly according to claim 1, wherein the at least one hall sensor is attached to a surface of the printed circuit board facing towards the at least one magnet and the protective cover covers the at least one hall sensor.

5. The steering sensor assembly according to claim 1, wherein the protective cover comprises at least one locking snap by which the protective cover is attached to the printed circuit board.

6. The steering sensor assembly according to claim 1, wherein the printed circuit board is attached to a housing part by the protective cover.

7. The steering sensor assembly according to claim 1, wherein the protective cover comprises at least one positioning pin and the printed circuit board comprises at least one corresponding hole into which the positioning pin engages.

8. An absolute steering sensor assembly, comprising:
a printed circuit board;
at least one hall sensor attached to the printed circuit board;
at least one magnet rotatably mounted such that the at least one magnet is rotated upon a rotation of a steering column, the at least one magnet being placed in proximity of the at least one hall sensor such that the at least one hall sensor can detect the magnetic field emitted by the at least one magnet; and
a protective cover attached to the printed circuit board such that the protective cover is placed between the at least one magnet and the printed circuit board,
wherein the printed circuit board is clamped between the protective cover and a first housing part.

9. An absolute steering sensor assembly, comprising:
a printed circuit board;
at least one hall sensor attached to the printed circuit board;
at least one magnet rotatably mounted such that the at least one magnet is rotated upon a rotation of a steering column, the at least one magnet being placed in proximity of the at least one hall sensor such that the at least one hall sensor can detect the magnetic field emitted by the at least one magnet, and
a protective cover attached to the printed circuit board such that the protective cover is placed between the at least one magnet and the printed circuit board,
wherein the protective cover includes locking snaps that protrude through a recess in the printed circuit board and further protrude beyond the printed circuit board and engage with a first housing part such that the protective cover is snapped into the first housing part.

* * * * *